INVENTOR
ROBERT J. KEMPER
BY William D. Hall
ATTORNEY

INVENTOR
ROBERT J. KEMPER
BY William D. Hall
ATTORNEY

April 15, 1958 R. J. KEMPER 2,831,189
WIDE BAND HOMING SYSTEM
Filed June 23, 1945 4 Sheets-Sheet 3

INVENTOR
ROBERT J. KEMPER
BY William D. Hall
ATTORNEY

April 15, 1958 R. J. KEMPER 2,831,189

WIDE BAND HOMING SYSTEM

Filed June 23, 1945

4 Sheets-Sheet 4

INVENTOR
ROBERT J. KEMPER

BY William D. Hall

ATTORNEY 2,831,189

WIDE BAND HOMING SYSTEM

Robert J. Kemper, Dayton, Ohio, assignor to the United States of America as represented by the Secretary of War Application June 23, 1945, Serial No. 601,274

3 Claims. (Cl. 343—844)

(Granted under Title 35, U. S. Code (1952), sec. 266)

The invention described herein may be manufactured and used by or for the Government for governmental purposes, without the payment to me of any royalty thereon.

The present invention relates to aircraft radio receivers employing switched antennae and has for an object the utilization of transmitted radio frequency energy for direction finding or "homing."

A further object of the invention is to provide mechanical means for so dividing continuous or pulsed-wave signals that the components of the signals may be employed aurally or visually to indicate azimuthal direction in relation to the signal source.

Another object is to provide a receiver with switched cardioidal antennae means which may be placed at variable distances from the radio receiver unit.

A further object is to allow such variable spacing between the receiver and the antenna switching means and still maintain the same phasing, frequency and field pattern characteristics of the antenna.

Another object is to provide means in such a homing antennae system for tone modulating received continuous or pulsed-wave signals.

A further object is to provide a directional switched antennae system which maintains its directivity over a relatively broad band of frequencies.

A further object is to so phase and match a switched antennae system by transmission line components that the system will provide satisfactory patterns over a considerable band of frequencies without adjustment or change of any part of the antenna system.

These and other objects will appear throughout the specification and will be pointed out in the claims.

Continuous or pulsed radio waves for homing on a broad band of frequencies provide an advantageous medium of directing aircraft during all types of weather and for night flying. The difficulties involved in employing such signals, however, have been many and diversified, one being that the various types of aircraft required different methods and locations of mounting for the antennae with respect to the receiver. To change location of these elements or the spacing between them would seriously affect the band width or the range of frequencies, often rendering directional reception impossible without special loading and balancing devices in the antenna array circuit.

The present invention employs the advantages of a vertically polarized twin-type antenna array having preferably a cardioidal field pattern of radiation about each member of the antennae due to mutual impedance and out-of-phase relationship. Since such antennae field strength patterns have their shorter vectors in contiguous relation and their longer vectors (or stronger fields) at their opposite outer perimeters, orientation of an aircraft by the alternate reception of a continuous signal first from one antenna and then the other has been effected.

To break up a continuous wave or signal into patterned, distinguishable sections, a single pole double throw switch is used to alternately make connection first with one antenna and then the other antenna of the twin antennae in timed sequence. That is, switching on and off of the two antennae is so timed alternately that from one antenna, for instance, the Morse code letter "D" is obtained, and from the other antenna the Morse code letter "U" is obtained. These two letter combinations are preferably used because their dot and dashes are complementary so that they form a continuous signal graphically resembling a straight line when the signal strength delivered to the receiver from the two antennae are equal. When the aircraft is off to the left or right of the desired course, however, the stronger field strength of one antenna in respect to the other will deliver a stronger signal to the receiver and this will be heard to the exclusion of the weaker signal from the other antenna. The total result is that, in effect, two distinguishable signals are generated from one continuous signal and they are so utilized that sensing may be accurately achieved from the relative strength of the two signals.

The breaking up of the continuous signal into two separate signals, is so performed that the coaxial lines from the antennae to the receiver are balanced regardless of the distance from antennae to the receiver in the aircraft, thereby permitting remote control of the switching. This is accomplished by accurately phasing the sections of lead lines from the antennae to the switching device, the latter serving to terminate the feed lines so that the open circuited or disconnected antenna in effect is "looking into" an open circuit. This termination then obviates the necessity for antenna loading devices such as variable capacitors, and permits the use of any length of lead line between the receiver and the antennae switching device and the length thereof will not affect phasing or frequency between the antennae.

It is to be understood that a suitable capacitor (not shown) is applied to the automatic volume control circuit of the receiver in order to prevent automatic volume control recovery between keying characters. This gives a slow automatic volume control time constant and prevents the automatic volume control from following instantaneous changes of keyed signal. This type of time constant control of response of automatic volume control is well known in the radio art and therefore will not be described herein.

Figures 1, 2, 3, 4:
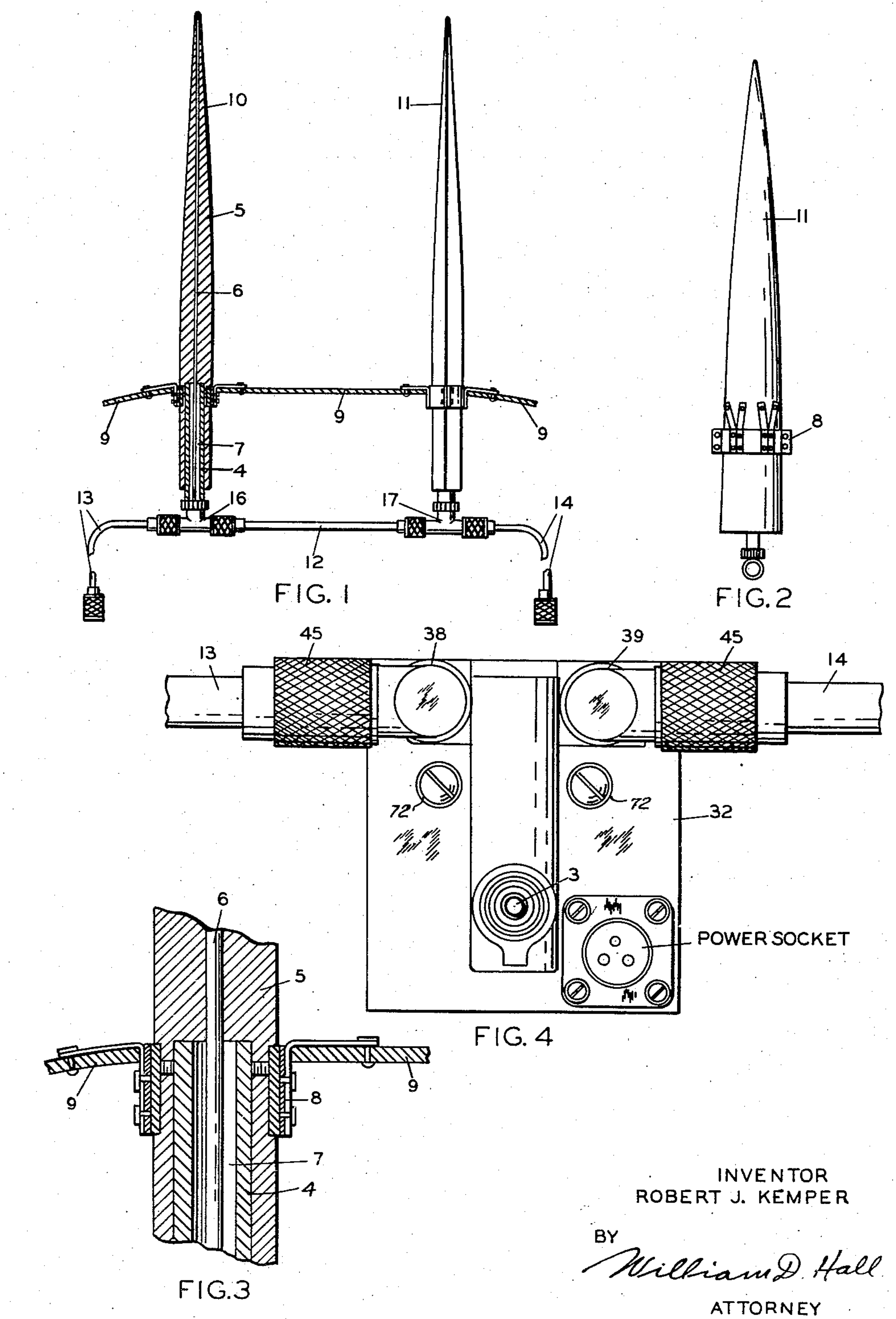
Fig. 1 is a diagrammatic view partly broken and partly in section of the antennae array.
Fig. 2 is a side elevation of one of the mast antennae members shown in Fig. 1, wherein the grounding straps on the grounding clamp are illustrated in an upright position.
Fig. 3 is an enlarged view in section, and partly broken, of the antenna base shown in Fig. 1.
Fig. 4 is an end view of the switch unit showing the couplings to the phasing lines.

Referring more particularly to Fig. 1 of the drawing there is shown an antennae assembly which includes a pair of whip antennae 10 and 11 of one-quarter wave length. These antennae are covered by a streamlined compressed phenolic impregnated plywood housing 5 in which the specific gravity decreases from base to tip. The radiators of antennae 10 and 11 are preferably metal rods 6 extending centrally and longitudinally of the housing 5. These rods 6 also extend through a portion of an air-core section of coaxial line 7 which is inserted at the lower ends of housings 5. The coaxial lines 7 form connections to flexible phasing cables and halfwave conductors 13 and 14 through T and angle couplings. The outer conductor 4 of the short air-core coaxial section 7 is grounded through grounding clamp 8 forming electrical connection with outer conductor 4 through a bored section of the housing 5. Clamp 8 is secured to the skin 9 of the aircraft by riveting or otherwise and the entire whip antenna assembly is secured to the inner structure of the aircraft by a clamp or in any other conventional manner. The lower compressed wood portion thus furnishes a rigid mounting surface for mounting the antenna mast to the aircraft to withstand severe air-drag and strain.

The novel antenna assembly, then, comprises a pair of quarterwave length whip antennae attachable to the wing or fuselage surface of an aircraft, the left antenna 10 being spaced any convenient distance from the right antenna 11, this distance being preferably about seven inches when employed for use with signals in the frequency range of 120–140 megacycles. A phasing connecting section of coaxial cable 12 forms a continuous connection between the two antennae 10 and 11 and serves to establish optimum electrical phasing between the two antennae to secure the desired antenna field patterns.

Figure 13:
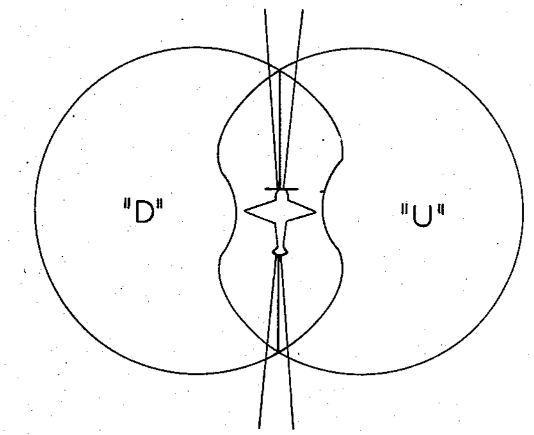
Fig. 13 is a diagrammatic representation of a cardioidal type of field pattern used in connection with the present invention.
Figure 12:
Fig. 12 is a graphic representation of a continuous single signal which is received when the aircraft is on the homing course wherein the antennae fields are of equal strength, the vertical lines representing the points of antenna changeover of the switch contacts.
Figure 19:
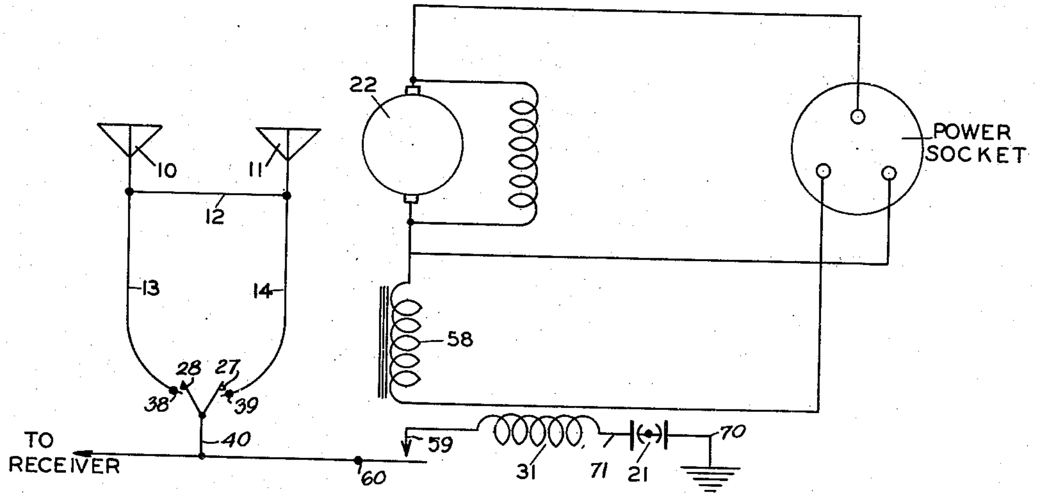
Fig. 19 is a schematic diagram of the antennae switching system.
Figure 14:
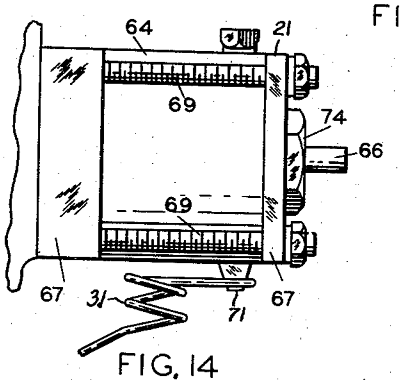
Fig. 14 is a side elevation of the rotary capacitor shown in Figs. 5 and 6.
Figure 15:
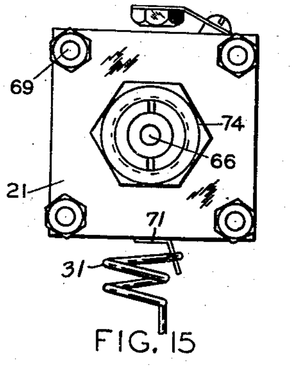
Fig. 15 is a right end elevation of the capacitor shown in Fig. 14.
Figure 16:
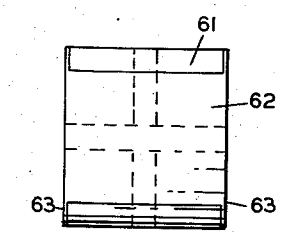
Fig. 16 is a side elevation of the rotor employed in the rotary capacitor.
Figure 17:
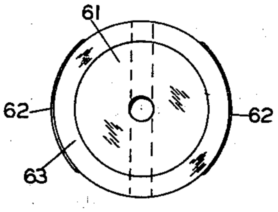
Fig. 17 is an end view of the rotor of Fig. 16.
Figure 18:
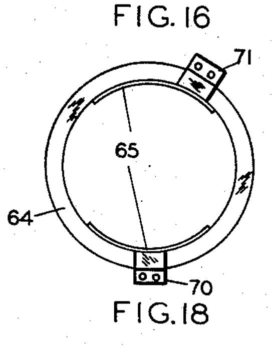
Fig. 18 is an end view of the stator portion of the rotary capacitor.

Referring now to Fig. 13 which shows the two cardioidal patterns of the antenna system, it is seen that when the receiver is connected to, say, the left antenna 10 of Fig. 19 by closing contacts 28 and 38 the cardioidal pattern "D" is obtained, while when the receiver is connected to the other antenna 11 by closing contacts 27 and 39, then the inverse cardioidal pattern "U" is obtained. Thus the antenna array, including the two antennae 10 and 11 connected together by the phasing cable 12, provides an antenna structure having two different cardioidal patterns, one being the inverse of the other, depending on which antenna is connected to the receiver. When the aircraft is "on course" the signals from the antenna combination 10 giving pattern "D" is equal to the signals from antenna combination 11 giving pattern "U." When the aircraft is headed to the left, the signals from antenna combination 10 giving pattern "D" are greater than the signals from antenna combination 11 giving pattern "U."

Now referring more particularly to Figs. 1, 4, 8 and 19, a pair of coaxial connecting cables 13 and 14 connect the antennae 10 and 11 to a switching unit 32. The cables 13 and 14 are of such a length that the electrical length from each antennae 10 and 11 to the switching unit 32 is one-half wave length or a multiple thereof. Since these half wave connecting coaxial cables 13 and 14 extend from the antennae 10 and 11 to the switch unit 32, the effect is the same as though the switch unit 32 were inserted at switch-over points 16 and 17 of antenna assembly 10 and 11. To attempt to mount the switch at the antennae base, however, would present insurmountable mechanical difficulties which are effectively obviated by this novel means of remotely transferring the switching point through flexible cables, which electrically, introduce no phasing difference in the line.

Thus, since the half-wave lines 13 and 14 provide points of null shunt admittance in the vicinity of junction points 16 and 17 adjacent to the bases of the antennae 10 and 11 and also at switch terminals 38 and 39 of switching unit 32, the length of lead line from the switching unit 32 to the receiver, 80, will not affect the phase relationship between antenna 10 and antenna 11 since electrically it effectively joins the half wave cables 13 and 14 at the switch terminals 38 and 39. Therefore, the same relative patterns will be maintained with any length of line between the keyer unit 32 and the radio receiver.

*Tone modulator*

Referring to Figs. 5, 6, 7, 8 and 19, local tone modulation of the received signal is accomplished by a rotating capacitor 21 and a series coil 31. A rotor 61 of capacitor 21 is directly driven by a motor 22 which also drives the switch cam 23 through a reduction train of gears. Since the motor speed used in one embodiment is 12,000 R. P. M. and the rotating capacitor 21 is of the split stator type, there will be four points of series resonance at the proper points of interplate capacitance in the rotary capacitor 21 per revolution of the motor, thereby producing an audio-frequency tone modulation of approximately 800 cycles per second on incoming signals, audible on head phones 81, Fig. 19. Coil 31 is employed in series with the capacitor 21 so that series resonance at carrier frequency is obtained four times for each complete revolution of the rotor 61 of capacitor 21.

Figure 11:
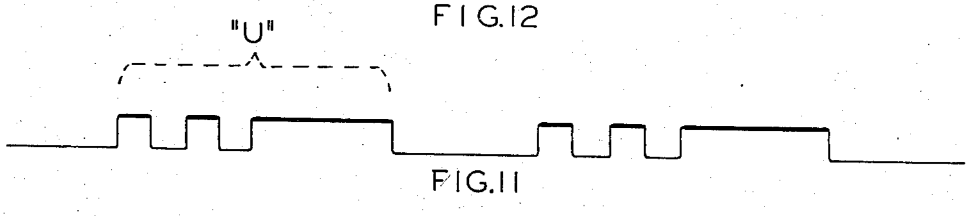
Fig. 11 is a graphic representation of the difference in the strength of the signals received when the aircraft has veered to the left, thereby increasing the strength of the right or "U" antenna field and decreasing that of the left, or "D" antenna.
Figure 10:
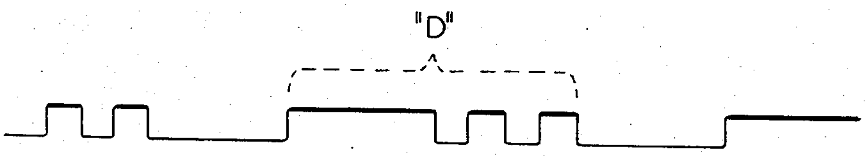
Fig. 10 is a graphic representation of the reverse condition to that shown in Fig. 11, the heavy lines illustrating the stronger signal received when the aircraft has veered to the right of the homing course, thereby producing a stronger signal from the left or "D" antenna.
Figure 8:
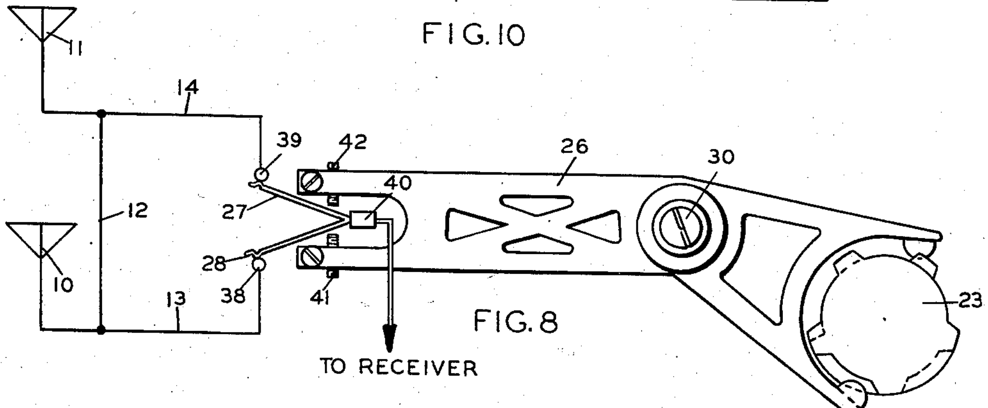
Fig. 8 is a schematic diagram of the keying or switching section of the invention, illustrating the switching of the antennae to produce the two signals in periodic sequence, the cam and cam-actuated lever being shown in a top plan view and the broken cam outline representing the return lobes.

The switch cam 23 actuates the switch arms 27 and 28 through switch lever 26. In Fig. 8 it is to be noted that the switch cam 23 has cam lifts on its periphery which are adapted to control the signal fed to the receiver so that this signal corresponds to the dots and dashes shown in Figs. 10 and 11. A switch cam 23 and lever 26 arrangement are employed to cause the switching lever 26 to follow the cam lifts in both directions. This is a conventional arrangement to eliminate a lever return spring and will be readily understood by those familiar with the art.

It will be further noted in Fig. 8 that switching of the arms 27 and 28 is so performed that at no time during the switching cycle are both of the antennae 10 and 11 simultaneously switched out of the receiver circuit. That is, when the switch cam 23 and the lever 26 are at center-point position both switch arms 27 and 28 are in contact with their respective terminals 38 and 39. The breaking of either one of the circuits from the pair of antennae 10 and 11 to the receiver occurs without simultaneously breaking the other circuit so as to provide a slight period of overlap. This is accomplished because the two switch arms 27 and 28 form a resilient bifurcated switch pole and the arms 27 and 28 yield sufficiently between switching alternations to allow opening of one antenna circuit without disturbing the other. Switching lever 26 is pivotally mounted on a pin 30, the lever 26 being preferably constructed of a light strong dielectric material such as a molded phenolic-impregnated fabric.

*Switching unit*

Figure 5:
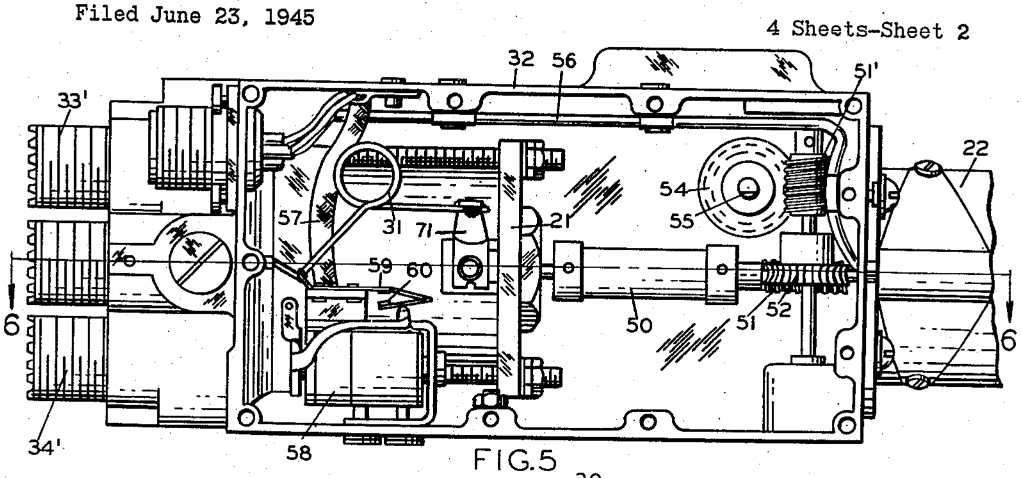
Fig. 5 is a bottom view of the switching unit as viewed from the reverse side of Fig. 8, the cover being removed to expose the gearing, rotary capacitor and capacitor relay.
Figures 6, 7:
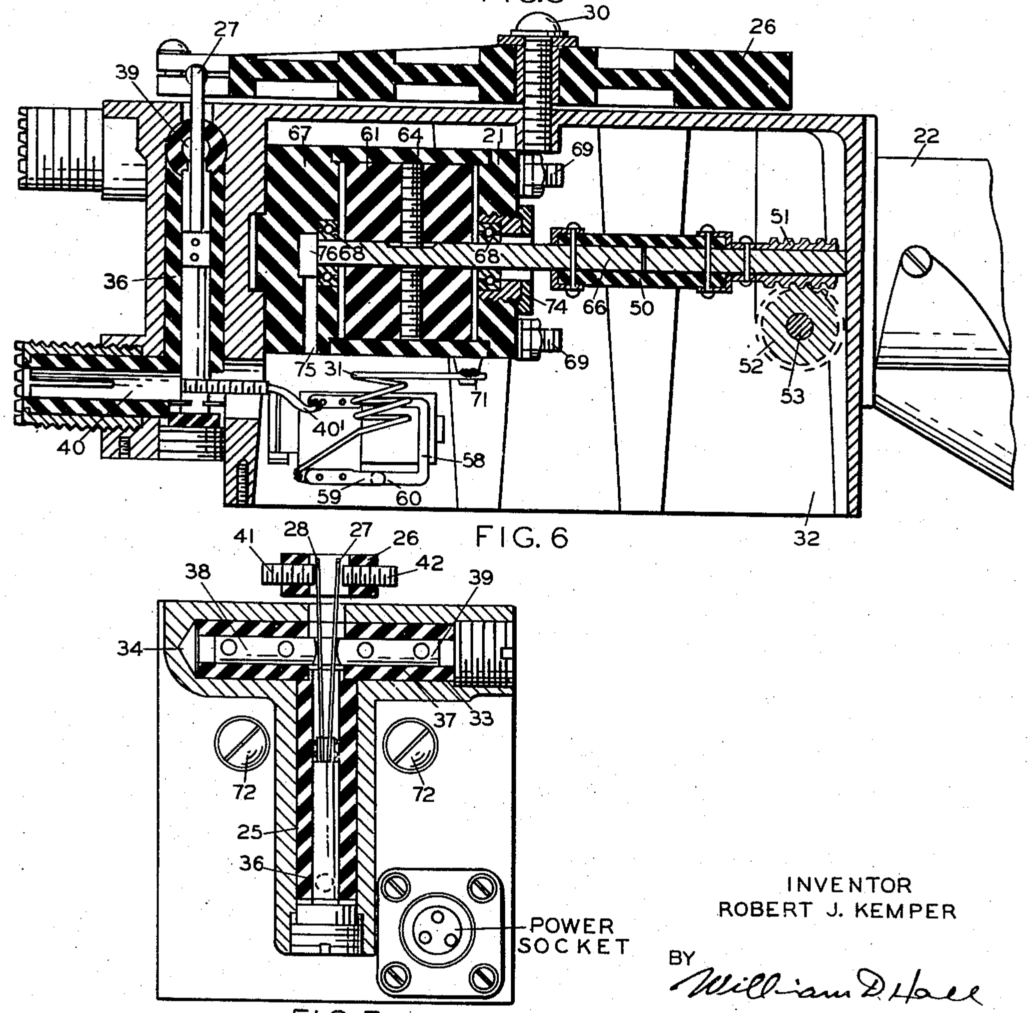
Fig. 6 is a cross-sectional view of the switching unit taken along 6—6 of Fig. 5, some of the parts being shown in elevation.
Fig. 7 is a left end view, partly in section, of the switch unit shown in a similar view in elevation in Fig. 4, the sectioned portions revealing the coaxial lead line character of the switch contacts.
Figure 9:
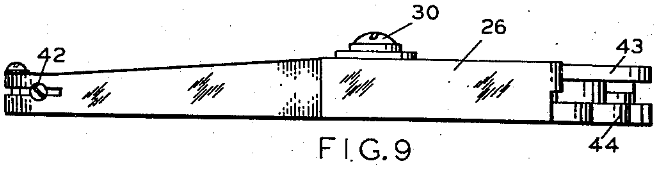
Fig. 9 is a side elevation of the switch cam and lever illustrated in Fig. 8.

Figs. 5, 6, and 7, illustrate more in detail the switching unit 32. This unit comprises a housing 32, preferably of a cast construction with continuous bored sections 33, 34, and 25 provided to retain the polystyrene insulating sleeves 36 and 37 which in turn retain switch terminals 38, 39 and 40 of the switching unit in proper impedance-matched relationship so as to maintain the chosen characteristic of the coaxial antennae lines. It will be noted especially in Figs. 8 and 9 that the cam switching lever 26 is provided with adjustable set-screw switch pole actuating studs 41 and 42, and preferably of insulating material and being adjustable so that the amount of switching overlap in the switch arms 27 and 28 can be variably adjusted for elimination of contact noise. The half-wave coaxial cables 13 and 14 from the antennae 10 and 11 are secured to the switching unit 32 by ordinary coaxial coupling members 45 which fit onto housing receptacles 33' and 34' with the result that continuous impedance-matched cables extend from the antennae 10 and 11, to, and including, the switch parts, thereby eliminating attenuation or mismatch from discontinuity. It will be noted, also, that the contact portions of switch terminals 38 and 39 are tapered to a blunt nose to further eliminate any tendency toward clicking when making and breaking contact with switch pole arms 27 and 28.

The housing 32 of the switch unit forms the ground circuit in continuation with the outer conductor of coaxial cables 13 and 14, which terminate at the skin 9 of the aircraft. The central conductor of the coaxial cables 13 and 14 forms continuous contact between the antennae 10 and 11 and the switch terminals 38 and 39. Then from switch terminal 40, to which the resilient switch arms 27 and 28 are secured, a lead line forms direct connection to the aircraft receiver.

The motor 22 in Figs. 5 and 6 is attached to the housing 32 so that its shaft is in line with the rotor shaft 66 of capacitor 21 to which it is connected by a flexible coupling member 50, and this shaft also has pinned thereon a worm 51 which is adapted to mesh with a worm gear 52. Worm gear 52 is pinned to shaft 53 and, through another worm 51', drives worm gear 54 which drives cam shaft 55 on which is pinned switch cam 23. Motor 22, therefore, drives the rotor 61 of capacitor 21 directly at its own speed of rotation and drives cam 23 through a double worm reduction train of gears. When cam 23 is rotated, the lobes on one of its peripheries 43 actuates lever 26 in one direction on pivot pin 30, while the lobes on the opposite periphery 44 act as follower lobes to oscillate the lever 26 in the opposite direction, the switch arms 27 and 28 being alternately forced away from their respective contacts 38 and 39 at each cycle of oscillation of the lever 26.

Included also in the housing 32 are the power conduit 56 for energizing the motor 22, and the conduit 57 for powering the relay coil of relay 58. The function of the switch contacts 59 and 60 actuated by relay 58 is to switch in and out of the antennae circuits the coil 31 so that the operator may remotely switch the local tone modulation in or out of the antennae circuits. The relay 58 is of the simple make and break type and is normally deenergized. Consequently, the local tone modulation is inoperative until the relay 58 is energized to a closed position. Closing relay switch contacts 59 and 60 closes the induction coil 31 circuit between the center pole switch member 40 and the rotating capacitor 21 through conductor 40'. Since local tone modulation may or may not be required, the desirable feature of being able to remotely dispense with tone modulation at will from the pilot's cockpit at a considerable distance from the switching unit is provided.

The antennae 10 and 11 act alternately as directors when switched out of circuit. This function is of great advantage in signal power output. Such a system has a high comparative signal strength over any switched antenna system employing reactance loaded antennae because such loading devices sharply limit the operable band width which may be obtained with fixed adjustment.

*Rotary capacitor*

The construction of the rotary capacitor 21 is illustrated in Fig. 6 and Figs. 14 to 19 inclusive.

The materials of which the stator 64 and the rotor 61 are constructed are preferably any plastic composition of suitable strength and dielectric properties such as a linen base phenolic or glass fibre base phenolic.

The outer surface of rotor body 61 is provided with diametrically opposite metallized areas 62. Similar metallized surfaces 65 are provided on two diametrically opposite portions of the inner surface of the stator 64. The metallized surface may be applied by electro-plating, spraying, painting or in any other convenient manner such that it will have sufficient cohesive power especially on the rotor 61 to withstand centrifugal force of rotation of the rotor at about 12,000 R. P. M. which is the speed at which the motor 22 will drive the rotor 61 for the desired tone modulation.

In order to provide electrical conductivity between the metallized surfaces of rotor 61, additional metallized coating 63 is applied to the edge faces of rotor 61 thereby minimizing reactive inductance but retaining electrical conductance between the opposite metallized peripheral surfaces 62. This additional metallized coating 63 is illustrated as being in the form of an annular band on both faces of the rotor 61. The coatings 62 and 63 thereby form a continuous path for the passage of electrical energy from one to the other of said metallized peripheral surfaces 62.

The cooperating stator 64 likewise has diametrically opposed metallized surfaces 65, but in this case there is no direct electrical connection between the opposite surfaces, capacitance being established therebetween by the rotor surfaces 62. There is, however, an independent continuation of the stator surfaces to the outer periphery of the stator so as to provide leads for securing terminals 70 and 71 in electrical contact with their respective stator metalized surfaces 65. Thus, there is provided a continuously variable capacitor whose input is through one stator plate terminal 70 and the output through stator plate terminal 71, or vice versa, while the rotor plates 62 continuously vary the capacitance by alternately greater and lesser capacitance between rotor and stator plates due to rotation of the metallized surfaces towards and away from each other.

The housing of the capacitor 21 comprises two plastic end plates 67, both of which are bored to receive an anti-friction bearing 68 for the drive shaft 66. These end plates are also turned at their outer edges to form short plug sections over which the plastic stator ring 64 is telescoped and anchored by clamping bolts 69 extending through bolt holes in the end plate corners.

The complete capacitor 21 is mounted in the housing 32 by mounting bolts 72 which are screwed into one of the end plates 67. Locknut bearing retainer 74 acts as a bearing tension member in conventional manner.

Oil is fed to the bearings through oil hole 75 and felt pad 76.

The circuit of capacitor 21 extends from terminal 70, through surface 65 and is capacitively coupled through one rotor plate 62, thence through annular metallized connector surface 63 to the other metallized surface of rotor 62, thence capacitively coupled to the other stator metallized surface 65, then through terminal 71 to coil 31, through said coil 31 to relay contacts 59 and 60, and through conduit 40' to the center switch pole conductor 40.

To operate the equipment, the receiver is tuned to the transmitting station on which homing is desired. Relay 58 and motor 22 are then energized thereby throwing the switch unit 32 into operation to alternately switch from one antenna 10 to the other 11, and simultaneously modulating the received and keyed signal with an audible tone derived from rotary capacitor 21 and coil 31. Referring now to Fig. 13 in conjunction with Figs. 10, 11 and 19 it will be seen that the incoming signal which is heard on head phones 81 will be either the Morse code signal "U" or "D," depending on whether the station transmitting the received signal is in the direction where the right antenna field "U" is stronger or weaker than the field of left antenna 10. If the received signal is not distinguishable as a code character but is a continuous equi-signal tone, the aircraft is directly in line with the transmitting antenna. Whether the aircraft is headed towards or away from the beacon linearly, however, is ordinarily determined in conventional manner by veering the aircraft to one side to see whether "U" or "D" will be the signal received when headed away from the equi-signal direction.

From the foregoing description it will be observed that a very simple device has been provided which may be applied as an attachment to any receiver operable within a broad frequency band. It is further to be noted that any continuous wave or audio tone or frequency pulse transmitting station, fixed or moving can be used as a target for homing and there is no limit to the number of aircraft which can simultaneously be directed to the same station. The very simplicity of the system is such that it is of utility in very small as well as large craft, where weight, cost and simplicity of operation are of prime importance in judging its acceptability for wide usage and adoption by the aircraft industry.

A remotely switched antenna system is provided which is easily mounted anywhere on the fuselage or wing of the aircraft, and which can be employed to locate the direction of a signal source whether on the ground or in another aircraft in flight; and it is also to be observed that either by banking the receiving aircraft or by positioning the antennae one above the other instead of being spaced horizontally, the angle or elevation of a beacon aircraft in relation to the receiving aircraft can be ascertained since in this case the antennae fields will extend in vertical relationship.

While the invention has been shown and described in its preferred embodiment it is anticipated that changes in the details thereof may be made within the scope of the appended claims.

Having thus described the invention what is claimed is:

1. A wide band continuous wave homing antenna system for navigable craft comprising a receiver, a pair of antennae having an electrical length substantially a quarter wavelength at the mid-frequency of the operating band mounted vertically on said craft and spaced horizontally a distance of the order of $\frac{1}{12}$ wavelength at said mid-frequency whereby the mutual impedance has a value of the order of the radiation resistance, a short section of transmission line connecting the antennae together, two coaxial cables connected to the lower ends of the antennae respectively, each cable having an electrical length substantially equal to a half wavelength at said mid-frequency or a multiple thereof; and switching means adapted to connect the receiver alternately to the ends of said half wavelength cables; the aforesaid circuit combination including a frequency responsive antenna reactance compensating circuit traceable from a first antenna through said short section of transmission line to the input terminal of the second antenna whereby said second antenna acting through said mutual impedance induces a voltage in said first antenna having a quadrature component in phase opposition to the off-resonance antenna reactance voltage therein thereby neutralizing a substantial part thereof and broadening the operating frequency band.

2. A homing antenna system for aircraft comprising, a receiver responsive to continuous wave signals; a dual pattern directional antenna system responsive over a wide band of frequencies including a pair of quarter wavelength antennae mounted vertically on said craft and spaced horizontally a distance of the order of $\frac{1}{12}$ wavelength at the mid-frequency of the operating band; a phasing transmission line joining the lower ends of said antennae having an electrical length of the order of a quarter wavelength at said mid-frequency, two transmission lines connected to the lower ends of the antennae respectively having an electrical length substantially equal to a half wavelength at said mid-frequency or a multiple thereof; switching means adapted to connect the receiver alternately to the ends of said half wavelength lines thereby receiving signals alternately from each of two antenna combinations, said phasing transmission line together with one antenna connected thereto constituting a frequency responsive antenna reactance compensating circuit adapted to induce quadrature voltages in the other antenna to neutralize a substantial part of the off-resonance reactance voltage therein thereby substantially broadening the operating frequency band.

3. A directional antenna system responsive to a wide band of frequencies including a pair of quarter wavelength antennae resonant at the mid-frequency of the operating band and spaced apart a distance of the order of $\frac{1}{12}$ wavelength at said mid-frequency, a phasing transmission cable having an electrical length of the order of a quarter wavelength at said mid-frequency joining the ends of said antenna, said phasing cable together with one antenna constituting a frequency responsive antenna reactance compensating circuit adapted to induce quadrature voltages in the other antenna to neutralize a substantial part of the off-resonance reactance voltage therein thereby to broaden the operating frequency band.

References Cited in the file of this patent

UNITED STATES PATENTS

| | | |
|---|---|---|
| 1,683,739 | Stone | Sept. 11, 1928 |
| 1,961,598 | Scheppmann | June 5, 1934 |
| 1,962,202 | Meredith | June 12, 1934 |
| 2,054,160 | Leib | Sept. 5, 1936 |
| 2,151,922 | Kramer | Mar. 28, 1939 |
| 2,160,857 | Gothe | June 6, 1939 |
| 2,187,097 | Pope | Jan. 16, 1940 |
| 2,198,445 | Wesselink | Apr. 23, 1940 |
| 2,216,708 | Kolster | Oct. 1, 1940 |
| 2,251,708 | Hefele | Aug. 5, 1941 |
| 2,271,550 | Hermanspann et al. | Feb. 3, 1942 |
| 2,275,296 | Hagen | Mar. 3, 1942 |
| 2,368,298 | Harris | Jan. 30, 1945 |
| 2,411,034 | Gluyas et al. | Nov. 12, 1946 |
| 2,413,018 | Willoughby | Dec. 14, 1946 |